US011927784B2

(12) United States Patent
Qu et al.

(10) Patent No.: US 11,927,784 B2
(45) Date of Patent: Mar. 12, 2024

(54) DISPLAY DEVICE

(71) Applicant: BOE Technology Group Co., Ltd., Beijing (CN)

(72) Inventors: Caiyu Qu, Beijing (CN); Yanjun Hao, Beijing (CN); Huijuan Zhang, Beijing (CN); Xueyan Tian, Beijing (CN); Zheng Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/483,546

(22) Filed: Sep. 23, 2021

(65) Prior Publication Data

US 2022/0099874 A1 Mar. 31, 2022

(30) Foreign Application Priority Data

Sep. 29, 2020 (CN) .......................... 202011051270.7

(51) Int. Cl.
*G02B 5/30* (2006.01)
*G02F 1/1335* (2006.01)
*G02F 1/1343* (2006.01)

(52) U.S. Cl.
CPC ......... *G02B 5/3058* (2013.01); *G02B 5/3016* (2013.01); *G02F 1/133528* (2013.01); *G02F 1/133553* (2013.01); *G02F 1/1343* (2013.01)

(58) Field of Classification Search
CPC ................ G02B 5/3058; G02B 5/3016; G02F 1/133528; G02F 1/133553; G02F 1/1343
See application file for complete search history.

(56) References Cited

U.S. PATENT DOCUMENTS

| | | | | |
|---|---|---|---|---|
| 2014/0353609 | A1* | 12/2014 | Song | .................... H01L 27/3276 438/23 |
| 2018/0113366 | A1* | 4/2018 | Kaneko | ............... G02F 1/13439 |
| 2019/0123119 | A1* | 4/2019 | Miyamoto | ........ H01L 29/78609 |
| 2020/0241378 | A1* | 7/2020 | Wei | ......................... G02F 1/163 |
| 2021/0210559 | A1* | 7/2021 | Chen | ...................... H01L 27/323 |
| 2022/0290041 | A1* | 9/2022 | Goto | ......................... C09K 9/02 |
| 2022/0324385 | A1* | 10/2022 | Li | ............................ B60R 1/088 |
| 2022/0376209 | A1* | 11/2022 | Tian | ..................... H10K 50/856 |
| 2022/0384537 | A1* | 12/2022 | Tian | ..................... H10K 59/879 |

FOREIGN PATENT DOCUMENTS

CN 107170780 A * 9/2017 ........... G06F 3/0412

* cited by examiner

*Primary Examiner* — Edward J Glick
*Assistant Examiner* — David Y Chung
(74) *Attorney, Agent, or Firm* — IPro, PLLC

(57) ABSTRACT

Provided is an anti-dazzling device, including a first electrode, a second electrode and a dimming structure, wherein the first electrode and the second electrode are disposed opposite to each other, and the dimming structure is disposed between the first electrode and the second electrode and is configured to change a light transmittance of the anti-dazzling device under action of voltage. An OLED display device and a method for manufacturing an anti-dazzling device are also provided.

12 Claims, 3 Drawing Sheets

DISPLAY DEVICE

CROSS-REFERENCE TO RELATED APPLICATION

This application is based on and claims priority to the Chinese Patent Application No. 202011051270.7, filed on Sep. 29, 2020 and entitled "ANTI-DAZZLING DEVICE AND METHOD FOR MANUFACTURING SAME, AND OLED DISPLAY DEVICE", the disclosure of which is herein incorporated by reference in its entirety.

TECHNICAL FIELD

The present disclosure relates to the field of display device, and more particularly, to an anti-dazzling device and a method for manufacturing the same, and an OLED display device.

BACKGROUND

Mirror display technologies are a new kind of display technologies. A display device manufactured from mirror display technology can not only exhibit pictures to perform normal display, but also function as a mirror. Thus, such devices can find applications in structures such as an on-board rearview mirror display.

SUMMARY

In a first aspect, the embodiments of the present disclosure provide an anti-dazzling device, which includes a first electrode, a second electrode, and a dimming structure; the first electrode and the second electrode are disposed opposite to each other, and the dimming structure is disposed between the first electrode and the second electrode and is configured to change a light transmittance of the anti-dazzling device under action of voltage.

Optionally, the dimming structure is an electrochromic layer.

Optionally, the electrochromic layer includes a cationic electrochromic layer, an anionic electrochromic layer and a polymer dielectric gel layer; the cationic electrochromic layer and the anionic electrochromic layer are disposed opposite to each other, and the polymer dielectric gel layer is disposed between the cationic electrochromic layer and the anionic electrochromic layer;

the cationic electrochromic layer is attached to the first electrode, and the anionic electrochromic layer is attached to the second electrode.

Optionally, a color of the electrochromic layer is blue after being energized.

Optionally, the cationic electrochromic layer is made of at least one of the following materials:
triphenylamine;
ferrocene;
phenazines; or
phenothiazines.

Optionally, the anionic electrochromic layer is made of at least one of the following materials:
viologens; or
substituted viologen derivatives.

Optionally, the anti-dazzling device further includes a first polarizer and a second polarizer, wherein the first polarizer is disposed on a side of the first electrode distal from the second electrode, and the second polarizer is disposed on a side of the second electrode distal from the first electrode; the dimming structure is an electrophoretic polarizing layer.

Optionally, the electrophoretic polarizing layer is made of a nematic liquid crystal material.

Optionally, the first electrode is made of at least one of the following materials:
indium tin oxide; or
indium zinc oxide.

Optionally, the second electrode is made of at least one of the following materials:
indium tin oxide; or
indium zinc oxide.

In a second aspect, an embodiment of the present disclosure provides an OLED display device, including an anti-dazzling device and an OLED display unit, wherein the anti-dazzling device is disposed on a display surface of the OLED display unit, and the anti-dazzling device includes a first electrode, a second electrode and a dimming structure; the first electrode and the second electrode are disposed opposite to each other, and the dimming structure is disposed between the first electrode and the second electrode and is configured to change a light transmittance of the anti-dazzling device under action of voltage.

Optionally, the OLED display unit includes a low-temperature polysilicon backplane, a pixel definition layer, a thin film encapsulation layer and a reflective metal layer, wherein the pixel definition layer, the thin film encapsulation layer and the reflective metal layer are sequentially stacked on a surface of the low-temperature polysilicon backplane.

Optionally, an embodiment of the present disclosure provides a method for manufacturing an anti-dazzling device, wherein the method includes:
preparing a first electrode and a second electrode; and
preparing a dimming structure between the first electrode and the second electrode, wherein the dimming structure is configured to change a light transmittance of the anti-dazzling device under action of voltage.

Optionally, the dimming structure is an electrochromic layer, and preparing the dimming structure between the first electrode and the second electrode includes:
sequentially preparing an anionic electrochromic layer, a polymer electrolyte gel layer and a cationic electrochromic layer on the second electrode; and
disposing the first electrode on the cationic electrochromic layer.

Optionally, the anionic electrochromic layer, the polymer electrolyte gel layer and the cationic electrochromic layer are prepared by a glue coating process.

Optionally, the dimming structure is an electrophoretic polarizing layer, and the method further includes:
disposing a first polarizer on a side of the first electrode distal from the second electrode; and
disposing a second polarizer on a side of the second electrode distal from the first electrode.

Optionally, preparing the dimming structure between the first electrode and the second electrode, includes:
preparing a nematic liquid crystal on the second electrode; and
disposing the first electrode on the nematic liquid crystal.

Optionally, the first electrode and the second electrode are prepared by a sputter coating process.

REFERENCE SIGNS

Figure 1:
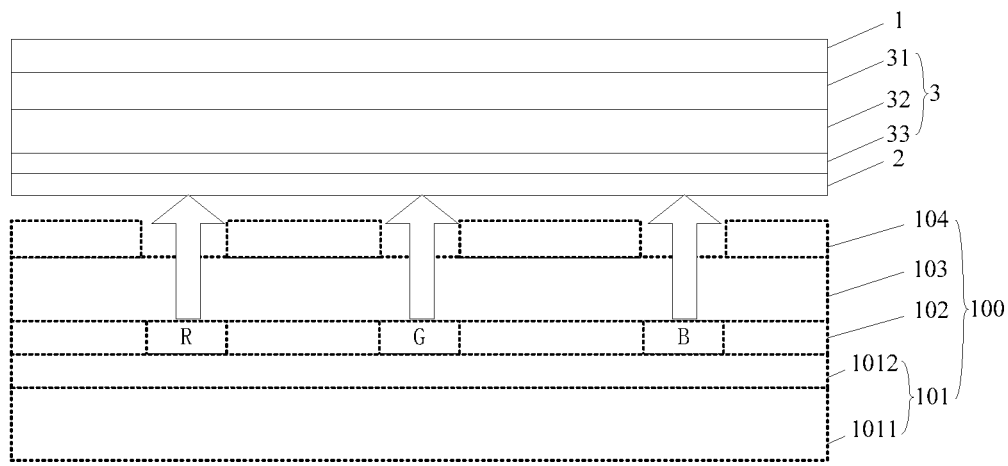
FIG. 1 is a schematic structural diagram of an anti-dazzling device applied to an OLED display unit according to an embodiment of the present disclosure.

100—OLED display unit; 1—first electrode; 2—second electrode; 3—electrochromic layer; 31—cationic electrochromic layer; 32—anionic electrochromic layer; 33—polymer dielectric gel layer; 4—electrophoretic polarizing layer; 41—first polarizer; 42—second polarizer.

DETAILED DESCRIPTION

In order to make the objectives, technical solutions, and advantages of the present disclosure clearer, the technical solutions of the present disclosure are described clearly and completely hereinafter in combination with the accompanying drawings of the present disclosure. Apparently, the described embodiments merely represent a part of the embodiments of the present disclosure, rather than all of the embodiments. Based on the described embodiments of the present disclosure, other embodiments obtained by persons of ordinary skill in the art without creative effort are within the protection scope of the present disclosure.

Unless otherwise defined, the technical or scientific terms used in the present disclosure shall have the ordinary meaning understood by persons of ordinary skill in the art to which the disclosure belongs. The terms "first", "second" and the like used in the present disclosure are not intended to indicate any order, quantity or importance, but are merely used to distinguish different components. The terms "include, includes and including" or "comprise, comprises and comprising" and the like are used to indicate that the element or object preceding the terms encompasses the element or object following the terms and its equivalents, and shall not be understood as excluding other elements or objects. The terms "connection" or "attach" and the like are not intended to be limited to physical or mechanical connections, but may include electrical connections, either direct or indirect connection. The terms "on", "under, "left" and "right" are only used to indicate the relative positional relationship. When the absolute position of the described object changes, the relative positional relationship may probably change accordingly.

In order to keep the following description of the present disclosure clear and concise, the detailed descriptions of known functions and known components are omitted in the present disclosure.

With a patterned mirror display technology, a display can both exhibit pictures and reflect light so as to both function as a display and a mirror, and may usually find applications in on-board rearview mirror displays. The rearview mirror can facilitate the driver to observe the road conditions behind the car and on both sides of the car during the driving process, which is an important safety component of cars. In the process of driving a vehicle, when driver observes the road conditions through rearview mirror, intense light reflected by the rearview mirror would cause the driver to feel dazzling by the glare. Dazzle refers to a physiological phenomenon that when strong light is suddenly incident to eyes of a driver, the optic nerves in the eyes are stimulated by the strong light and lose control of the eyes, and in this circumstance, the driver cannot see objects in the dark clearly, or may even tend to close his or her eyes instinctively. When a driver feels dazzling, a traffic accident may be likely to incur.

The embodiments of the present disclosure provide an anti-dazzling device applied to an OLED display unit, and the OLED display unit is an OLED display unit for realizing a mirror display.

In some embodiments, the OLED display unit may adopt the structure of an existing OLED display unit, which includes a low temperature polysilicon (LTPS) backplane, a pixel definition layer (PDL), a thin film encapsulation (TFE) layer, and a reflective metal layer. The low-temperature polysilicon backplane includes a PI film and a circuit layer. The circuit layer includes a plurality of thin film transistors, which are low-temperature polysilicon thin film transistors. The OLED display unit may be a flexible OLED display unit.

The anti-dazzling device includes a first electrode, a second electrode and a dimming structure. The first electrode and the second electrode are disposed opposite to each other, and the dimming structure is disposed between the first electrode and the second electrode, and is configured to change the light transmittance of the anti-dazzling device under the action of voltage.

The anti-dazzling device is disposed on a display surface of the OLED display unit. By changing the light transmittance of the anti-dazzling device, the intensity of the light irradiated to the reflective metal layer of the OLED display unit can be adjusted and the intensity of the light reflected by the OLED display unit can be changed. In this case, as an example, when a rearview mirror used in a vehicle is made from such OLED display units being provided with the anti-dazzling device, an anti-dazzling effect can be achieved as the user views images displayed by the OLED display unit, and thus the overall display effect of the rearview mirror can be improved.

FIG. 1 is a schematic structural diagram of an anti-dazzling device applied to an OLED display unit according to an embodiment of the present disclosure. In order to facilitate the description of the function of the anti-dazzling device, the OLED display unit 100 is schematically shown by dotted lines in FIG. 1. In the anti-dazzling device, the dimming structure includes an electrochromic layer 3. As shown in FIG. 1, the anti-dazzling device includes a first electrode 1, a second electrode 2 and an electrochromic layer 3. The electrochromic layer 3 is disposed between the first electrode 1 and the second electrode 2. The first electrode 1 and the second electrode 2 are configured to apply a voltage to the electrochromic layer 3. One of the first electrode 1 and the second electrode 2 is an anode, and the other is a cathode.

Exemplarily, when the anti-dazzling device is disposed on the OLED display unit 100, the second electrode 2 is disposed on the OLED display unit 100, for example, the second electrode 2 is attached to, or only contact the display surface of the OLED display unit 100. By adjusting the voltage applied to the first electrode 1 and the second electrode 2, the light transmittance of the electrochromic layer 3 can be changed, thereby adjusting the light transmittance of the anti-dazzling device. As such, the light irradiated to the reflective metal layer 104 of the OLED display unit 100 can be reduced and the intensity of the reflected light can be decreased, thereby avoiding the dazzling situation.

As shown in FIG. 1, the electrochromic layer 3 includes a cationic electrochromic layer 31, an anionic electrochromic layer 32, and a polymer dielectric gel layer 33. The cationic electrochromic layer 31 and the anionic electrochromic layer 32 are disposed opposite to each other, and the polymer dielectric gel layer 33 is disposed between the cationic electrochromic layer 31 and the anionic electrochromic layer 32. The cationic electrochromic layer 31 is attached to the first electrode 1, and the anionic electrochromic layer 32 is attached to the second electrode 2. When the first electrode 1 and the second electrode 2 apply a voltage to the electrochromic layer 3, a chemical reaction occurs in the electrochromic layer 3, resulting in a color change, thereby reducing the light transmittance of the electrochromic layer 3 to light in a certain wavelength range. As such the intensity of the light irradiated to the reflective metal layer 104 of the OLED display unit can be decreased, thereby avoiding the dazzling situation.

Optionally, the cationic electrochromic layer 31 includes at least one of triphenylamine, ferrocene, phenazines, or phenothiazines, and the anionic electrochromic layer 32 includes at least one of the viologens or substituted viologen derivatives. The viologens are a class of organic compounds with a general formula of $(C_5H_5NR)^{2n+}$. The substituted viologen derivatives may be, for example, ethyl viologen. The polymer electrolyte gel layer 33 acts as a redox filling layer to enhance the conductivity.

Figure 2:
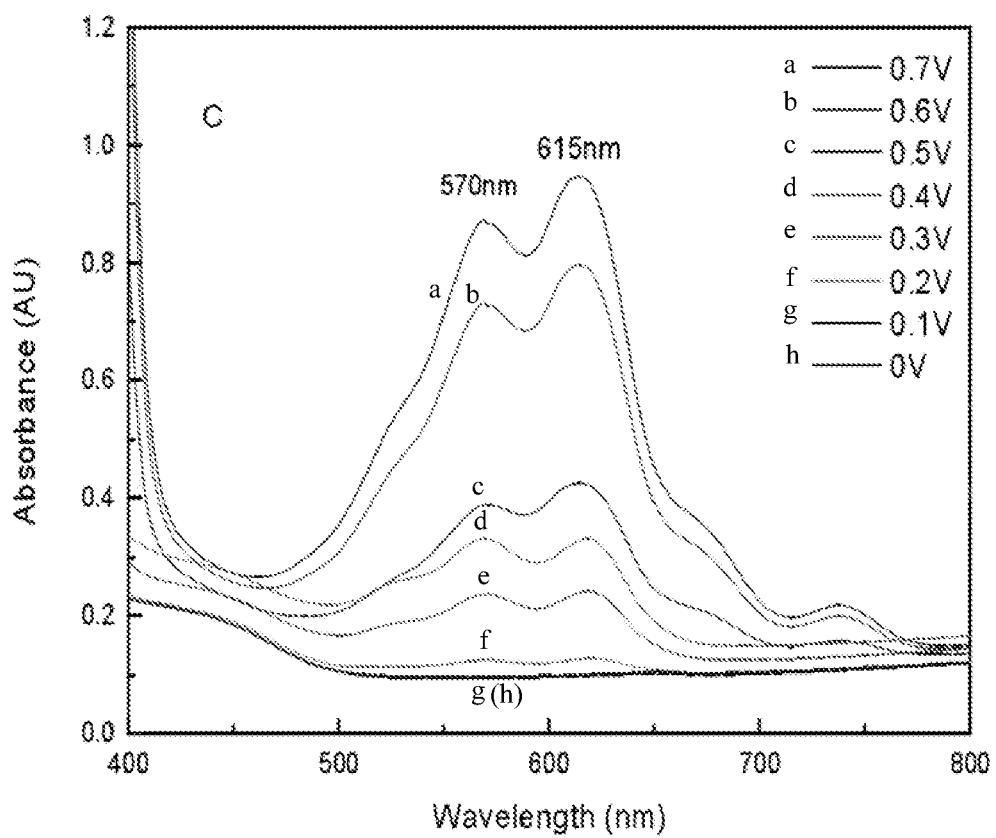
FIG. 2 is a schematic diagram of an absorption spectrum of ethyl viologen in the anti-dazzling device according to an embodiment of the present disclosure.

In the embodiments of the present disclosure, the color of the electrochromic layer 3 turns blue after being energized, or being applied a voltage. When under the action of voltage, the cationic electrochromic layer 31 and the anionic electrochromic layer 32 of the electrochromic layer 3 interact to form colored ions, for example, the radical cations of ethyl viologen, so that the electrochromic layer 3 turns blue but still transparent, which enables the electrochromic layer 3 to absorb light with a wavelength of 500-700 nm. As shown in FIG. 2. FIG. 2 shows an absorption spectrum of ethyl viologen to visible light under the driving voltage of 0-0.7 V. The absorption spectrum h under a driving voltage of 0 and the absorption spectrum g under a driving voltage of 0.1 V almost coincide. When the driving voltage reaches 0.6 V, ethyl viologen has a strong absorption on the light with the wavelength of 500-700 nm. Lights with different colors have different wavelengths, and human eyes have poor sensitivity to blue light, thus the blue light is the most suitable light source for human eyes. The electrochromic layer 3 absorbs the light with the wavelength of 500-700 nm, so that the electrochromic layer 3 exhibits a blue color visually. As the light with the wavelength of 500-700 nm is mainly yellow light, the electrochromic layer 3 can reduce the yellow light transmitted through the anti-dazzling device, and thus the light irradiated to the reflective metal layer 104 of the OLED display unit 100 is also reduced, thereby decreasing the intensity of the reflected light and avoiding the dazzling situation.

When stopping applying voltage to the first electrode 1 and the second electrode 2, the ethyl viologen molecules will return to a stable divalent state, and the electrochromic layer 3 will return to a colorless and transparent state, and thus the specular reflection and the display effect of the OLED display unit would not be affected.

In some embodiments, the first electrode 1 and/or the second electrode 2 are made of a transparent conductive material, such as indium tin oxide and/or indium zinc oxide, wherein the transparent conductive material is used to reduce the absorption of the electrode to light and lower the influence on the display effect of the OLED display unit.

Figure 3:
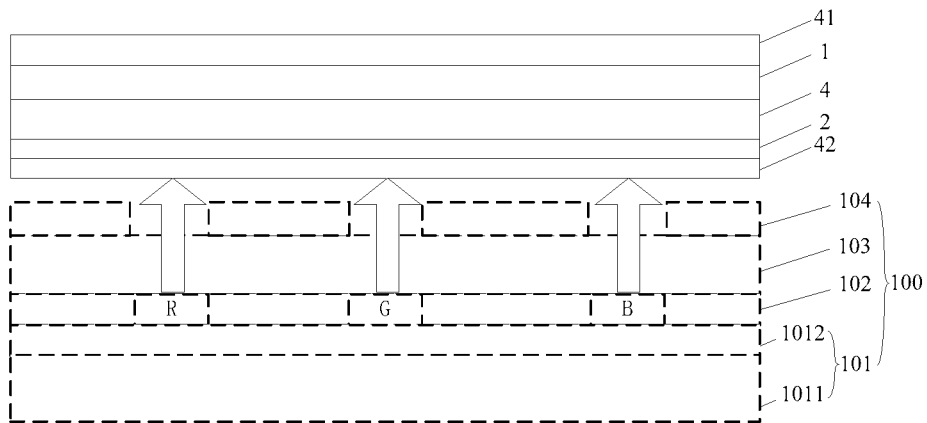
FIG. 3 is a schematic structural diagram of an anti-dazzling device applied to an OLED display unit according to an embodiment of the present disclosure.

FIG. 3 is a schematic structural diagram of an anti-dazzling device applied to an OLED display unit according to an embodiment of the present disclosure. In addition to the first electrode 1 and the second electrode 2, the anti-dazzling device further includes a first polarizer 41 and a second polarizer 42. The first polarizer 41 is disposed on a side of the first electrode 1 distal from the second electrode 2, the second polarizer 42 is disposed on a side of the second electrode 2 distal from the first electrode 1, and the dimming structure in the anti-dazzling device is an electrophoretic polarizing layer 4. The polarizing direction of the first polarizer 41 and the polarizing direction of the second polarizer 42 may form an arbitrary angle, for example, 0°, 45°, or 90°.

Exemplarily, when the anti-dazzling device is disposed on the OLED display unit 100, the second polarizer 42 is disposed on the OLED display unit 100, for example, the second polarizer 42 may be attached to the display surface the OLED display unit 100. By adjusting the voltage applied to the first electrode 1 and the second electrode 2, a state of the electrophoretic polarizing layer 4 can be changed, thereby adjusting the light transmittance of the anti-dazzling device, reducing the light irradiated to the reflective metal layer 104 of the OLED display unit 100, decreasing the intensity of reflected light, and avoiding the dazzling situation.

In some embodiments, the electrophoretic polarizing layer 4 is made of a nematic liquid crystal material. The liquid crystal molecules of nematic liquid crystal materials have a rod shape, and the polarization direction of polarized light will change after transmitting through the liquid crystal molecule. Utilizing this characteristic, after the ambient light becomes polarized light upon transmitting through the first polarizer 41, the polarization direction of the polarized light will change under the action of the electrophoretic polarizing layer 4 in process of transmitting through the electrophoretic polarizing layer 4. When the polarized light transmitted through the electrophoretic polarizing layer 4 is irradiated to the second polarizer 42, the intensity of light which can transmit through the second polarizer 42 is related to an angle between a polarization direction of the polarized light transmitted through the electrophoretic polarizing layer 4 and the polarizing direction of the second polarizer 42. By adjusting the voltage applied to the first electrode 1 and the second electrode 2, the polarization direction of the polarized light transmitted through the electrophoretic polarizing layer 4 can be adjusted, so that the intensity of light transmitted through the second polarizer 42 can be accordingly adjusted. That is, by adjusting the voltage applied to the first electrode 1 and the second electrode 2, the intensity of light transmitted through the second polarizer 42 can be accordingly adjusted, and the light irradiated to the reflective metal layer 104 of the OLED display unit 100 can in turn be adjusted. As such, when the intensity of the light transmitted through the second polarizer 42 is decreased, the light irradiated to the reflective metal layer 104 of the OLED display unit 100 is also reduced, the intensity of the reflected light is decreased, and the dazzling situation is alleviated or avoided.

Figure 4:
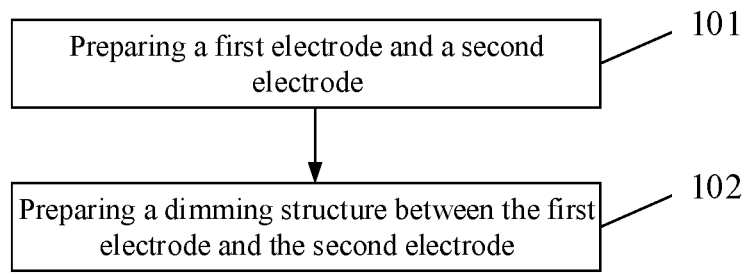
FIG. 4 is a flowchart showing a method for manufacturing an anti-dazzling device according to an embodiment of the present disclosure.

FIG. 4 is a flowchart showing a method for manufacturing an anti-dazzling device according to an embodiment of the present disclosure. The method can be used to manufacture the anti-dazzling devices shown in FIG. 1 and FIG. 3. As shown in FIG. 4, the method includes the following steps.

In step 101, a first electrode and a second electrode are prepared.

In step 102, a dimming structure is prepared between the first electrode and the second electrode.

Here, the dimming structure is configured to change the light transmittance of the anti-dazzling device under the action of voltage.

The anti-dazzling device is disposed on the display surface of the OLED display unit. By changing the light transmittance of the anti-dazzling device, the intensity of the light irradiated to the reflective metal layer of the OLED display unit can be adjusted and the intensity of the light reflected by the OLED display unit can be changed. In this case, as an example, when a rearview mirror used in a vehicle is made from such OLED display units being provided with the anti-dazzling device, an anti-dazzling effect can be achieved as the user views images displayed by the OLED display unit, and thus the overall display effect of the rearview mirror can be improved.

Figure 5:
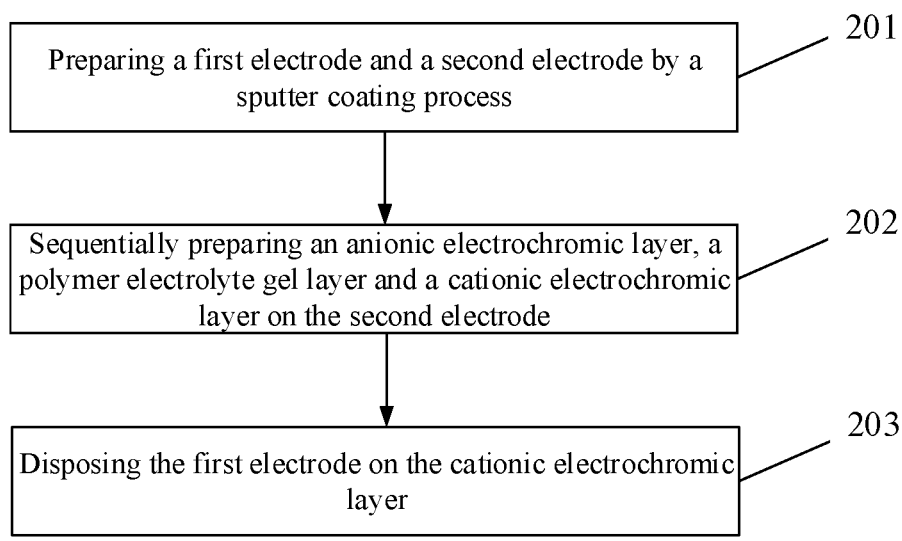
FIG. 5 is a flowchart showing a method for manufacturing an anti-dazzling device applied to an OLED display unit according to an embodiment of the present disclosure.

FIG. 5 is a flowchart showing a method for manufacturing an anti-dazzling device applied to an OLED display unit according to an embodiment of the present disclosure. The OLED display unit is an OLED display unit for implementing the mirror display. The anti-dazzling device is disposed on the display surface of the OLED display unit, so that when, for example, a rearview mirror used in a vehicle is made of such OLED display unit, the user can realize the anti-dazzling effect when viewing the images displayed by the OLED display unit, which improves the display effect. As for the manufacture of the OLED display unit, a low-temperature polysilicon backplane, a pixel definition layer, a thin film encapsulation layer, and a reflective metal layer can be prepared first according to a conventional process, so as to produce the OLED display unit for realizing the mirror display. After manufacturing the OLED display unit, an anti-dazzling device is manufactured by the manufacture method according to the embodiments of the present disclosure, and the anti-dazzling device is disposed on the display surface of the OLED display unit. Such method may be used to manufacture the anti-dazzling device shown in FIG. 1. Referring to FIG. 1, the method for manufacturing the anti-dazzling device includes the following steps.

In step 201, a first electrode 1 and a second electrode 2 are prepared by a sputter coating process.

In some cases, in order to avoid affecting the display effect of the OLED display unit, the first electrode 1 and/or the second electrode 2 are made of a transparent conductive material, such as indium tin oxide and/or indium zinc oxide.

Optionally, the thicknesses of the first electrode 1 and the second electrode 2 are in the range of 100 nm-200 nm. If the thickness of the electrode is too thick, the light transmittance of the electrode will decrease, which will affect the display brightness. If the thickness of the electrode is too thin, the resistance will increase, which is not conducive to the lateral spreading of the current in the electrode.

In step 202, an anionic electrochromic layer 32, a polymer electrolyte gel layer 33 and a cationic electrochromic layer 31 are sequentially prepared on the second electrode 2.

In some embodiments, the anionic electrochromic layer 32, the polymer electrolyte gel layer 33, and the cationic electrochromic layer 31 are prepared by a glue coating process.

Through sequentially preparing the anionic electrochromic layer 32, the polymer electrolyte gel layer 33, and the cationic electrochromic layer 31, the electrochromic layer 3 is prepared on the second electrode 2.

Optionally, the cationic electrochromic layer 31 includes at least one of triphenylamine, ferrocene, phenazines, or phenothiazines, and the anionic electrochromic layer 32 includes at least one of viologens or substituted viologen derivatives. The viologens are a class of organic compounds with the general formula $(C_5H_5NR)^{2n+}$. The substituted viologen derivatives may be, for example, ethyl viologen. The polymer electrolyte gel layer 33 acts as a redox filling layer to enhance the conductivity.

In step 203, the first electrode 1 is disposed on the cationic electrochromic layer 31.

When manufacturing the anti-dazzling OLED display device for use in, for example, the vehicle rearview mirror, the anti-dazzling device prepared by the above method can be attached to the display surface of the OLED display unit so as to obtain an OLED display device for realizing the mirror display with an anti-dazzling effect. Exemplarily, when a voltage is applied to the first electrode 1 and the second electrode 2, for example, through an on-board power supply, under the driving of the voltage, electrons inside the electrochromic layer 3 move among the cationic electrochromic layer 31, polymer electrolyte gel layer 33 and the anionic electrochromic layer 32, thereby forming a stable redox cycle. The color of the electrochromic layer 3 changes, so that the transmittance of the electrochromic layer 3 to the light in the certain wavelength range is reduced, thereby absorbing the light in the certain wavelength range.

In the embodiments of the present disclosure, the color of the electrochromic layer 3 turns blue after being energized. Under the action of voltage, the cationic electrochromic layer 31 and the anionic electrochromic layer 32 inside the electrochromic layer 3 interact to form colored ions, for example, the radical cations of ethyl viologen, so that the electrochromic layer 3 turns blue after being energized in the embodiments of the present disclosure, which enables the electrochromic layer 3 to absorb the light with a wavelength of 500-700 nm. As shown in FIG. 2, FIG. 2 shows an absorption spectrum of ethyl viologen to visible light under the driving voltage of 0-0.7 V. Lights with different colors have different wavelengths, and human eyes have poor sensitivity to blue light, thus the blue light is the most suitable light source for human eyes. The electrochromic layer 3 absorbs the light with the wavelength of 500-700 nm, so that the electrochromic layer 3 exhibits a blue color visually. As the light with the wavelength of 500-700 nm is mainly yellow light, the electrochromic layer 3 can reduce the yellow light transmitted through the anti-dazzling device, and thus the light irradiated to the reflective metal layer of the OLED display unit 100 is also reduced, thereby decreasing the intensity of the reflected light and avoiding the dazzling situation.

When stopping applying voltage to the first electrode 1 and the second electrode 2, the ethyl viologen molecules will return to a stable divalent state, and the electrochromic layer 3 will return to a colorless and transparent state, and thus the specular reflection and the display effect of the OLED display unit would not be affected.

Figure 6:
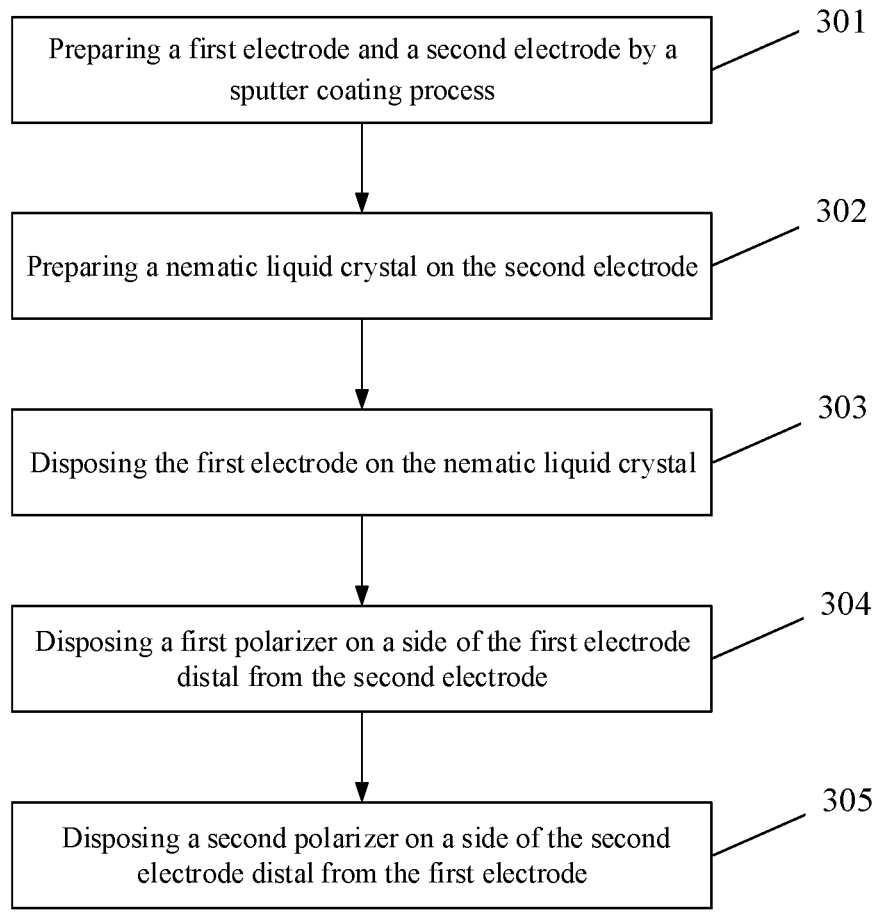
FIG. 6 is a flowchart showing a method for manufacturing another anti-dazzling device applied to an OLED display unit according to an embodiment of the present disclosure.

FIG. 6 is a flowchart showing a method for manufacturing an anti-dazzling device applied to an OLED display unit according to an embodiment of the present disclosure. The OLED display unit is an OLED display unit for implementing the mirror display. The anti-dazzling device is disposed on the display surface of the OLED display unit, so that when, for example, a rearview mirror used in a vehicle is made of such OLED display unit, the user can realize the anti-dazzling effect when viewing the images displayed by the OLED display unit, which improves the display effect. As for the manufacture of the OLED display unit, a low-temperature polysilicon backplane, a pixel definition layer, a thin film encapsulation layer, and a reflective metal layer can be prepared first according to a conventional process, so as to produce the OLED display unit for realizing the mirror display. After manufacturing the OLED display unit, an anti-dazzling device is manufactured by the manufacture method according to the embodiments of the present disclosure, and the anti-dazzling device is disposed on the display surface of the OLED display unit. Such method may be used to manufacture the anti-dazzling device shown in FIG. 3. Referring to FIG. 3, the method for manufacturing the anti-dazzling device includes the following steps.

In step 301, a first electrode 1 and a second electrode 2 are prepared by a sputter coating process.

In some cases, in order to avoid affecting the display effect of the OLED display unit, the first electrode 1 and/or the second electrode 2 are made of the transparent conductive material, such as indium tin oxide and/or indium zinc oxide.

Optionally, the thicknesses of the first electrode 1 and the second electrode 2 are in the range of 100 nm-200 nm. If the thickness of the electrode is too thick, the light transmittance of the electrode will decrease, which will affect the display brightness. If the thickness of the electrode is too thin, the resistance will increase, which is not conducive to the lateral spreading of the current in the electrode.

In step 302, a nematic liquid crystal is prepared on the second electrode.

In some embodiments, the electrophoretic polarizing layer 4 is prepared on the second electrode 2 by using, for example, a nematic liquid crystal material through a cell molding process.

In step 303, the first electrode 1 is disposed on the nematic liquid crystal.

In step 304, a first polarizer 41 is disposed on a side of the first electrode 1 distal from the second electrode 2.

In step 305, a second polarizer 42 is disposed on a side of the second electrode 2 distal from the first electrode 1.

The polarizing direction of the first polarizer 41 and the polarizing direction of the second polarizer 42 form an arbitrary angle, for example, 0°, 45°, or 90°.

When manufacturing the anti-dazzling OLED display device used in, for example, the vehicle rearview mirror, the anti-dazzling device manufactured by the above method can be attached to the OLED display unit to obtain an OLED display device for realizing mirror display with an anti-dazzling effect. Exemplarily, when a voltage is applied to the first electrode 1 and the second electrode 2 through, for example, the on-board power supply, the liquid crystal molecule deflects under the action of an electric field.

By adjusting the voltage applied to the first electrode 1 and the second electrode 2, the polarization direction of the polarized light transmitted through the electrophoretic polarizing layer 4 can be adjusted, so that the intensity of light transmitted through the second polarizer 42 can be accordingly adjusted. That is, by adjusting the voltage applied to the first electrode 1 and the second electrode 2, the intensity of light transmitted through the second polarizer 42 can be accordingly adjusted, and the light irradiated to the reflective metal layer of the OLED display unit 100 can in turn be adjusted. As such, when the intensity of the light transmitted through the second polarizer 42 is decreased, the light irradiated to the reflective metal layer of the OLED display unit 100 is also reduced, the intensity of the reflected light is decreased, and the dazzling situation is alleviated or avoided.

The anti-dazzling device of the embodiments of the present disclosure can alleviate or avoid the dazzling situation caused by intense light when the OLED display unit for realizing the mirror display is applied to the on-board rearview mirror, thereby improving use experience, and avoiding occurrence of traffic accident.

Figure 7:
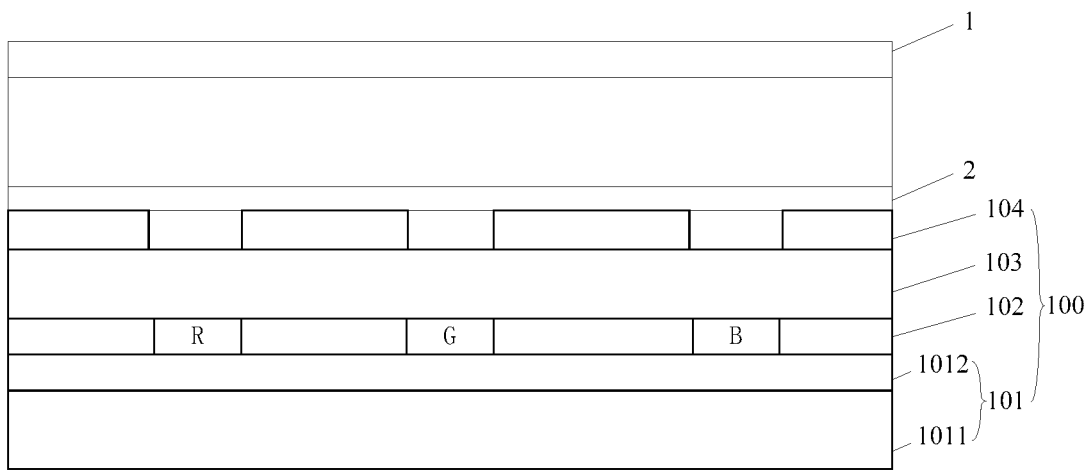
FIG. 7 is a schematic structural diagram of an OLED display device according to an embodiment of the present disclosure.

FIG. 7 is a schematic structural diagram of an OLED display device according to an embodiment of the present disclosure. The OLED display device includes an OLED display unit and any one of the anti-dazzling devices shown in FIG. 1 or FIG. 3. The anti-dazzling device is disposed on the display surface of the OLED display unit 100. The anti-dazzling device includes a first electrode 1, a second electrode 2 and a dimming structure. The first electrode 1 and the second electrode 2 are disposed opposite to each other, and the dimming structure is disposed between the first electrode 1 and the second electrode 2. The dimming structure is configured to change a light transmittance of the anti-dazzling device under the action of voltage.

When the OLED display device is used in, for example, the vehicle rearview mirror, the anti-dazzling effect can be realized when the user views the image displayed by the OLED display device, and the overall display effect of the rearview mirror can be improved. The OLED display unit here can adopt the structure of an existing OLED display unit.

Exemplarily, as shown in FIG. 7, the OLED display unit 100 includes a low-temperature polysilicon backplane 101, a pixel definition layer 102, a thin film encapsulation layer 103, and a reflective metal layer 104. The low-temperature polysilicon backplane 101 includes a PI film 1011 and a circuit layer 1012. The circuit layer 1012 includes a plurality of thin film transistors which are low temperature polysilicon thin film transistors. The pixel definition layer 102 is provided with a plurality of pixel openings, and a pixel structure is disposed in each of the pixel openings. In the embodiment of the present disclosure, the pixel structure includes an OLED light emitting device. The reflective metal layer 104 is provided with a plurality of openings which have a one-to-one correspondence with the pixel openings, so that light emitted by the OLED light emitting device can transmit through the reflective metal layer 104.

In addition, although the exemplary embodiments have been described herein, the scope includes any and all embodiments based on the present disclosure with equivalent elements, modifications, omissions, combinations (for example, technical solutions where various embodiments are crossed), adaptations, or changes. The elements in the claims will be interpreted broadly based on the words in the claims, and are not limited to the embodiments described in the present specification or during the implementation of the present application, and the embodiments shall be interpreted as non-exclusive. Therefore, the present specification and embodiments are merely intended to be regarded as some examples, and the real scope and spirit are indicated by the following claims and the full scope of their equivalents.

The above description is intended to be illustrative rather than restrictive. For example, the above embodiments (or one or more embodiment thereof) can be used in combination with each other. For example, persons of ordinary skill in the art may use other embodiments when reading the above descriptions. In addition, in the above specific embodiments, various features may be grouped to simplify the present disclosure, which should not be construed as an intent that an unclaimed disclosed feature is necessary for any claim. On the contrary, the subject matter of the present disclosure may be less than all the features of a specific embodiment as disclosed. The scope of the present disclosure should be determined with reference to the appended claims and the full scope of equivalents entitled by these claims.

The above embodiments are merely exemplary embodiments of the present disclosure and are not intended to limit the present disclosure, and the protection scope of the present disclosure is defined by the claims. Persons skilled in the art can make various modifications or equivalent substitutions to the present disclosure within the essence and protection scope of the present disclosure, and such modifications or equivalent substitutions should also be regarded as falling within the protection scope of the present disclosure.

What is claimed is:

1. An OLED display device, comprising an anti-dazzling device and an OLED display unit, wherein the anti-dazzling device is disposed on a display surface of the OLED display unit, and the anti-dazzling device comprises a first electrode, a second electrode and a dimming structure; the first electrode and the second electrode are disposed opposite to each other, and the dimming structure is disposed between the first electrode and the second electrode and is configured to change a light transmittance of the anti-dazzling device under action of voltage;

the OLED display unit comprises a low-temperature polysilicon backplane, a pixel definition layer, a thin film encapsulation layer and a reflective metal layer; the pixel definition layer, the thin film encapsulation layer and the reflective metal layer are sequentially stacked on a surface of the low-temperature polysilicon backplane; and the pixel definition layer is provided with a plurality of pixel openings, and an OLED light emitting device is disposed in each of the pixel openings; the reflective metal layer is provided with a plurality of metal layer openings which have a one-to-one correspondence with the pixel openings.

2. The OLED display device according to claim 1, wherein the low-temperature polysilicon backplane comprises a PI film and a plurality of low-temperature polysilicon thin film transistors.

3. The OLED display device according to claim 1, wherein a thickness of the first electrode and a thickness of the second electrode are in a range of 100 nm-200 nm.

4. The OLED display device according to claim 1, wherein the dimming structure is an electrochromic layer.

5. The OLED display device according to claim 4, wherein the electrochromic layer comprises a cationic electrochromic layer, an anionic electrochromic layer and a polymer dielectric gel layer; the cationic electrochromic layer and the anionic electrochromic layer are disposed opposite to each other, and the polymer dielectric gel layer is disposed between the cationic electrochromic layer and the anionic electrochromic layer; and wherein the cationic electrochromic layer is attached to the first electrode, and the anionic electrochromic layer is attached to the second electrode.

6. The OLED display device according to claim 5, wherein a color of the electrochromic layer is blue after being energized.

7. The OLED display device according to claim 6, wherein the cationic electrochromic layer is made of at least one of the following materials:
triphenylamine;
ferrocene;
phenazines; or
phenothiazines.

8. The OLED display device according to claim 6, wherein the anionic electrochromic layer is made of at least one of the following materials:
viologens; or
substituted viologen derivatives.

9. The OLED display device according to claim 1, wherein the anti-dazzling device further comprises a first polarizer and a second polarizer; the first polarizer is disposed on a side of the first electrode distal from the second electrode, and the second polarizer is disposed on a side of the second electrode distal from the first electrode; and the dimming structure is an electrophoretic polarizing layer.

10. The OLED display device according to claim 9, wherein the electrophoretic polarizing layer is made of a nematic liquid crystal material.

11. The OLED display device according to claim 1, wherein the first electrode is made of at least one of the following materials:
indium tin oxide; or
indium zinc oxide.

12. The OLED display device according to claim 1, wherein the second electrode is made of at least one of the following materials:
indium tin oxide; or
indium zinc oxide.

* * * * *